(12) United States Patent
Brown

(10) Patent No.: US 8,707,769 B2
(45) Date of Patent: Apr. 29, 2014

(54) POWER PLANT ANALYZER FOR ANALYZING A PLURALITY OF POWER PLANTS

(71) Applicant: Rolls-Royce PLC, London (GB)

(72) Inventor: Steven Geoffrey Brown, Derby (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 13/622,627

(22) Filed: Sep. 19, 2012

(65) Prior Publication Data

US 2013/0074588 A1 Mar. 28, 2013

(30) Foreign Application Priority Data

Sep. 23, 2011 (GB) .................................. 1116413.4

(51) Int. Cl.
*G01M 15/14* (2006.01)

(52) U.S. Cl.
USPC ....................................................... 73/112.01

(58) Field of Classification Search
USPC ....................................................... 73/112.01
See application file for complete search history.

(56) References Cited

U.S. PATENT DOCUMENTS

| | | | |
|---|---|---|---|
| 4,546,353 A * | 10/1985 | Stockton | 340/966 |
| 5,285,638 A | 2/1994 | Russ et al. | |
| 8,290,683 B2 * | 10/2012 | Luppold | 701/100 |

FOREIGN PATENT DOCUMENTS

| | | |
|---|---|---|
| EP | 1 258 618 A2 | 11/2002 |
| JP | A-10-103081 | 4/1998 |
| RU | 2 250 382 C2 | 4/2005 |

OTHER PUBLICATIONS

Dec. 20, 2011 British Search Report issued in British Patent Application No. GB1116413.4.

* cited by examiner

*Primary Examiner* — Freddie Kirkland, III
(74) *Attorney, Agent, or Firm* — Oliff PLC

(57) ABSTRACT

A power plant analyzer for analyzing a plurality of power plants, comprising:

an analyzing apparatus for analyzing a first parameter indicative of fuel flow to a first power plant, a second parameter indicative of fuel burned in the first power plant, a third parameter indicative of fuel flow to a second power plant and a fourth parameter indicative of fuel burned in the second power plant; and an alert generation apparatus, responsive to the analyzing apparatus, for generating an alert for the first or the second power plant, and wherein analyzing the first, second, third and fourth parameters comprises carrying out a differential analysis between the first and third parameters to produce a first result, and to carry out a differential analysis between the second and fourth parameters to produce a second result, and comparing the first and second results.

22 Claims, 4 Drawing Sheets

US 8,707,769 B2

POWER PLANT ANALYZER FOR ANALYZING A PLURALITY OF POWER PLANTS

This invention claims the benefit of UK Patent Application No. 1116413.4, filed on 23 Sep. 2011, which is hereby incorporated herein in its entirety.

FIELD OF THE INVENTION

Embodiments of the present invention relate to a power plant analyzer. In particular, they relate to a power plant analyzer for analyzing a plurality of power plants.

BACKGROUND TO THE INVENTION

During operation a fault, such as a fuel leak, may occur in a power plant.

It would be beneficial to be able to detect faults such as fuel leaks during operation of a power plant so that an operator of the power plant may be alerted to the fault.

BRIEF DESCRIPTION OF VARIOUS EMBODIMENTS OF THE INVENTION

Some embodiments of the present invention provide for a power plant analyzer for analyzing a plurality of power plants.

According to various, but not necessarily all, embodiments of the invention there is provided a power plant analyzer for analyzing a plurality of power plants, comprising:

analyzing means for analyzing a first parameter indicative of fuel flow to a first power plant, a second parameter indicative of fuel burned in the first power plant, a third parameter indicative of fuel flow to a second power plant and a fourth parameter indicative of fuel burned in the second power plant; and alert generation means, responsive to the analyzing means, for generating an alert for the first or the second power plant, and wherein the analyzing means is configured to carry out a differential analysis between the first and third parameters to produce a first result, and to carry out a differential analysis between the second and fourth parameters to produce a second result, and to compare the first and second results.

According to various, but not necessarily all, embodiments of the invention there is provided a system comprising a power plant analyzer as described above and the first and second power plants.

According to various, but not necessarily all, embodiments of the invention there is provided a method for analyzing a plurality of power plants, comprising:

analyzing a first parameter indicative of fuel flow to a first power plant, a second parameter indicative of fuel burned in the first power plant, a third parameter indicative of fuel flow to a second power plant and a fourth parameter indicative of fuel burned in the second power plant; and generating, in response to analyzing, an alert for the first or the second power plant.

According to various, but not necessarily all, embodiments of the invention there is provided a computer program, that when run on a computer, performs:

analyzing a first parameter indicative of fuel flow to a first power plant, a second parameter indicative of fuel burned in the first power plant, a third parameter indicative of fuel flow to a second power plant and a fourth parameter indicative of fuel burned in the second power plant; and generating, in response to analyzing, an alert for the first or the second power plant, and wherein analyzing the first, second, third and fourth parameters comprises carrying out a differential analysis between the first and third parameters to produce a first result, and to carry out a differential analysis between the second and fourth parameters to produce a second result, and comparing the first and second results.

According to various, but not necessarily all, embodiments of the invention there is provided an apparatus comprising:

at least one processor and at least one memory including computer program code the at least one memory and the computer program code configured to, with the at least one processor, cause the apparatus at least to analyzing a first parameter indicative of fuel flow to a first power plant, a second parameter indicative of fuel burned in the first power plant, a third parameter indicative of fuel flow to a second power plant and a fourth parameter indicative of fuel burned in the second power plant; and generating, in response to analyzing, an alert for the first or the second power plant, and wherein analyzing the first, second, third and fourth parameters comprises carrying out a differential analysis between the first and third parameters to produce a first result, and to carry out a differential analysis between the second and fourth parameters to produce a second result, and comparing the first and second results.

Other aspects of the invention provide devices, methods and systems which include and/or implement some or all of the actions described herein. The illustrative aspects of the invention are designed to solve one or more of the problems herein described and/or one or more other problems not discussed.

BRIEF DESCRIPTION OF THE DRAWINGS

For a better understanding of various examples of embodiments of the present invention reference will now be made by way of example only to the accompanying drawings in which.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF VARIOUS EMBODIMENTS OF THE INVENTION

Figure 1:
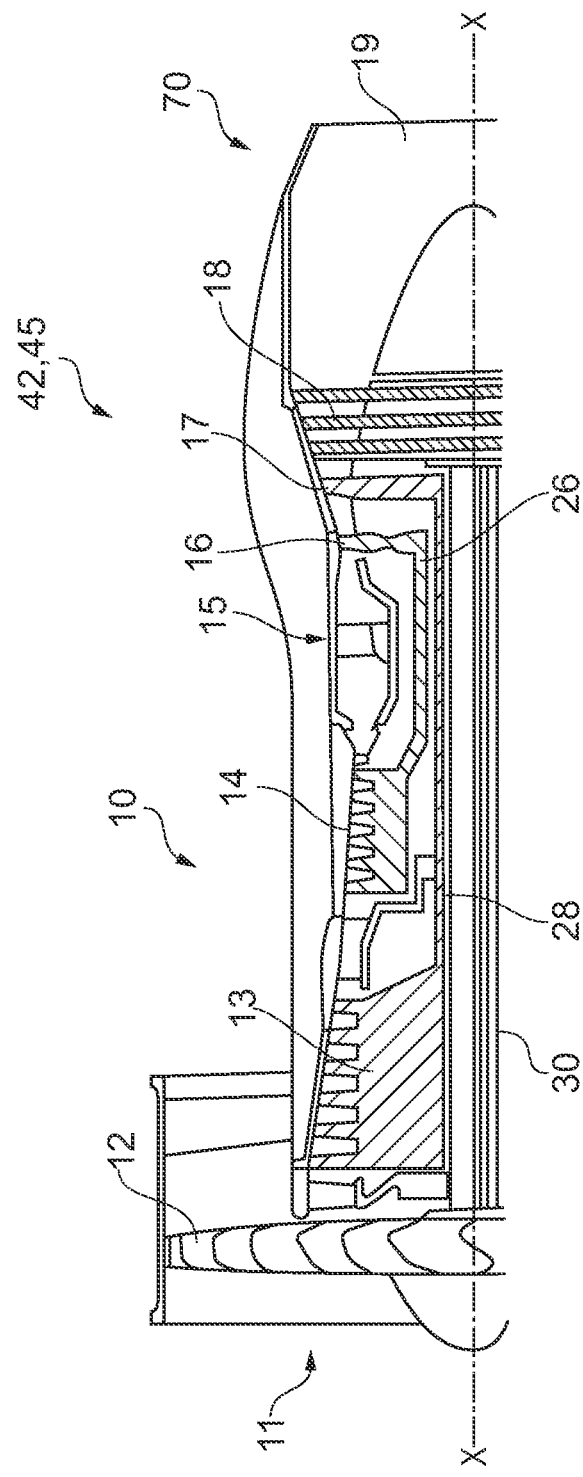
FIG. 1 illustrates, in cross section, an example of a power plant.

The Figures, with the exception of FIG. 1, illustrate a power plant analyzer 32 for analyzing a plurality of power plants 34, comprising analyzing means 36 for analyzing a first parameter 38 indicative of fuel flow to a first power plant 42, a second parameter 44 indicative of fuel burned in the first power plant 42, a third parameter 46 indicative of fuel flow to a second power plant 45 and a fourth parameter 48 indicative of fuel burned in the second power plant 45; and alert generation means 50, responsive to the analyzing means 36, for generating an alert 52 for the first or the second power plant 42, 45.

FIG. 1 illustrates an example of a power plant 42, 45. The power plant 42, 45 in the illustrated example is a gas turbine engine 10 for use with a vehicle. For example, the gas turbine engine may be an aero gas turbine engine 70.

In FIG. 1 the gas turbine engine 10 comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19. The gas turbine engine 10 illustrated in FIG. 1 may be an aero gas turbine engine and is an example of what the first and/or second power plants 42, 45 may be.

The gas turbine engine 10 operates in a conventional manner so that air entering the intake 11 is accelerated by the fan 12 which produces two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts 26, 28, 30.

The configuration of the gas turbine engine 10 illustrated in FIG. 1 is shown as an example only. Other configurations are also possible. For example, the gas turbine engine 10 may not include the intermediate pressure components and/or may comprise a booster compressor. Furthermore, the gas turbine engine may, for example, comprise a turboprop or a helicopter rotor via a gearbox.

Figure 2A:
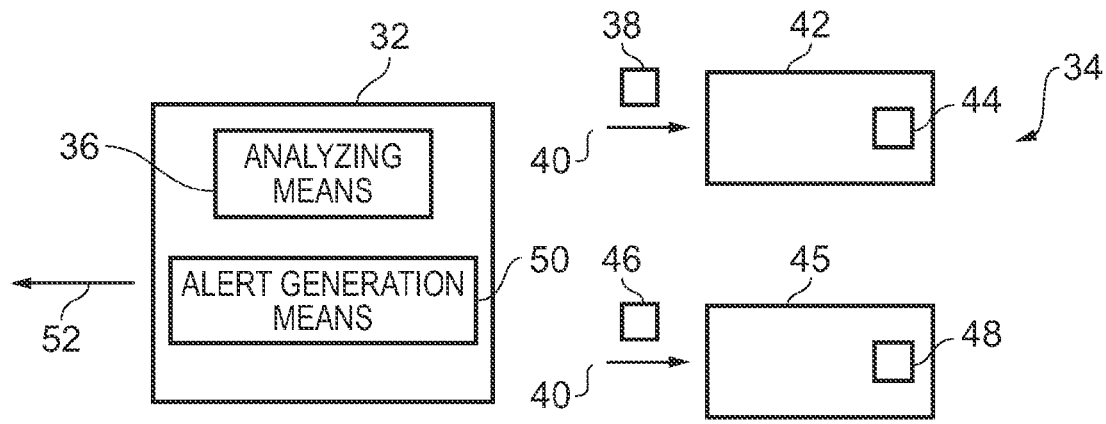
FIG. 2A illustrates a schematic example of a power plant analyzer.

FIG. 2A illustrates a schematic example of a power plant analyzer 32. The power plant analyzer 32 may, for example, be used to analyze a plurality of power plants 34. The plurality of power plants may comprise or may all be a power plant such as the power plant illustrated in FIG. 1.

The power plant analyzer 32 comprises analyzing means 36 for analyzing a plurality of power plants 34. For example, the analyzing means 36 may be configured to analyze a plurality of parameters derived from a first power plant 42 and a second power plant 45. The first or second power plant 42, 45 may be an average of a plurality of power plants (see FIG. 3).

The power plant analyzer 32 further comprises alert generation means 50 for generating an alert 52 in response to the analyzing means 36 carrying out an analysis of a plurality of power plants 34. The alert generation means may, for example, be configured to generate an audible and/or visual alert. Additionally/alternatively the alert generation means may, for example, be configured to generate a control signal that, for example, causes an audible and/or visual alert.

The analyzing means 36 is for analyzing a first parameter 38 that is indicative of the fuel flow 40 to a first power plant 42, a second parameter 44 that is indicative of fuel burned in the first power plant 42, a third parameter 46 that is indicative of the fuel flow 40 to a second power plant 45 and a fourth parameter 48 that is indicative of the fuel burned in the second power plant 45.

For example, the first parameter 38 may comprise the fuel flow rate to the first power plant 42 and the third parameter 46 may comprise the fuel flow rate to the second power plant 45. The second parameter 44 may comprise the turbine gas temperature 58 and/or the exhaust gas temperature 60 of the first power plant 42. The fourth parameter 48 may comprise the turbine gas temperature 58 and/or the exhaust gas temperature 60 of the second power plant 45 (See FIG. 3).

In embodiments, the analyzing means 36 is configured to carry out a differential analysis of the first, second, third and fourth parameters 38, 44, 46, 48. In some embodiments the analyzing means is configured to carry out a differential analysis between the first and third parameters 38, 46 to produce a first result and to carry out a differential analysis between the second and fourth parameters 44, 48 to produce a second result.

For example, the differential analysis between the first and third parameters 38, 46 and the second and fourth parameters 44, 48 may comprise calculating a difference between the first and third parameters 38, 46 and the second and fourth parameters 44, 46.

Additionally/alternatively the differential analysis between the first and third parameters 38, 46 and the second and fourth parameters 44, 48 may comprise calculating a ratio between the parameters, and/or the percentage difference and/or the fractional difference.

The analyzing means 36 is configured to compare the first and second results from the differential analysis.

In other embodiments the analyzing means 36 is configured to carry out a differential analysis between the first and second parameters 38, 44 and the third and fourth parameters 46, 48 to produce a first and second result respectively. This may comprise calculating a difference between the parameters and/or a ratio between the parameters. The analyzing means 36 is configured to compare the first and second results from the differential analysis.

The differential analysis of the four parameters provides a comparison of the fuel flowing to the first power plant 42 and the second power plant 45 and the fuel burned in the first power plant 42 and the second power plant 45. The results of the differential analysis may indicate that there is an unexpected difference between the analyzed power plants and an alert may be generated on this basis. For example, a fuel leak downstream of the fuel flow meter 64 (see FIG. 3) in the first or second power plant 42, 45 may be detected by the analysis.

It is known that as a power plant ages it will become less efficient due to deterioration. As a power plant deteriorates more fuel will be burned in the power plant to obtain a given power output, for example thrust. Burning more fuel in the power plant will lead to a higher temperature of exhaust gases from the power plant.

Therefore, for power plants that are in substantially the same operating conditions and at substantially the same power level there may be a difference in the amount of fuel flowing to the power plants if one of the power plants is older than the others.

The inventors have realized that if, in attempting to detect a fuel leak in the first or second power plant 42, 45 for example, a simple comparison of the fuel flow to the power plants does not take into account, among other factors, the deterioration levels of the power plants. The deterioration levels of the power plants may lead to a difference between the fuel flowing to the power plants. The difference in fuel flow due to deterioration could be, for example, approximately 4%.

This means that the margins required in a simple comparison of fuel flow to the power plants must be large to prevent false fuel leak alerts due to differences between the power plants due to deterioration, for example. Small fuel leaks may be missed in such a system which could be very problematic in embodiments where the power plants are aero gas turbine engines, for example.

The inventors have realized that by also considering parameters indicative of the fuel burned in the power plants this allows for greater sensitivity in the detection of fuel leaks, for example.

There may be other causes of expected differences between the first and second power plant, 42, 45. For example, in an embodiment where the power plants are aero gas turbine engines, more electrical and/or hydraulic energy may be being drawn from a particular engine, again requiring a greater fuel flow to that engine.

Returning to FIG. 2A, the analysis may indicate an unexpected difference between the fuel flowing to the first or second power plant 42, 45 and the fuel burned in the first or second power plant 42, 45.

As described above, by analyzing parameters indicating the fuel flowing to the power plants 42, 45 and fuel burned in the power plants 42, 45 it is possible to disambiguate a fuel leak from a difference between fuel flowing to the power plants due to a different level of deterioration of the power plants, for example.

The alert generation means 50 is configured to respond to the analyzing means 36. The alert generation means may be configured to respond to the analyzing means 36 determining from the four parameters 38, 44, 46, 48 that there is an unexpected difference in efficiency between the first and second power plants 42, 45.

For example, the alert generation means 50 may be configured to generate an alert 52 if it is determined that there is a difference between the first and second power plants 42, 45 beyond a threshold.

The alert generation means 50 may be responsive to the analyzing means 36 to generate an alert 52 indicating that there is a possible fuel leak in the first or second power plant 42, 45. A more detailed example of the analysis that may be carried out by the analyzing means 36 is given with regard to FIG. 2B below.

The first power plant 42 and/or the second power plant 45 may be a power plant such as the one illustrated in FIG. 1. The first power plant 42 and/or the second power plant 45 may be a gas turbine engine such as an aero gas turbine engine 70.

Figure 2B:
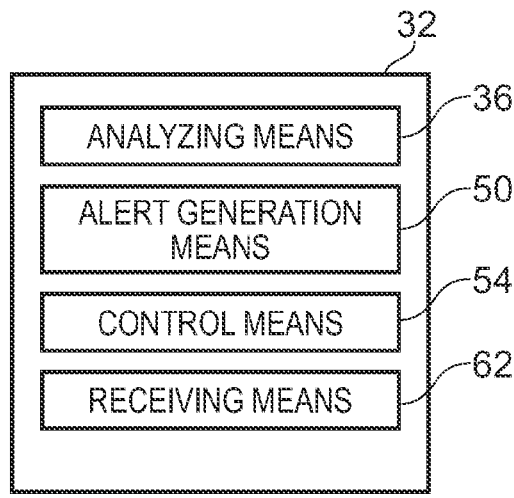
FIG. 2B illustrates a further schematic example of a power plant analyzer.

FIG. 2B illustrates a further schematic example of a power plant analyzer 32. The power plant analyzer 32 of FIG. 2B comprises analyzing means 36 and alert generation means 50 as described above with reference to FIG. 2A. The power plant analyzer 32 of FIG. 2B further comprises control means 54 and receiving means 62.

The controller 54 is for identifying when the first and second power plants 42, 45 are in a substantially steady state, and for enabling the analyzer 36 and/or the alert generator 50 in response to identifying that the first and second power plants 42, 45 are in a substantially steady state.

For example, the controller 54 may identify that a power plant is in a substantially steady state by establishing that the power plant has remained within ±1-2% of some power indicating parameter over a particular time period, such as 30 seconds for example.

As a further example, the controller 54 may identify that a power plant is in a substantially steady state, in the case where the power plant is an aero engine, when the aircraft to which the aero engine is comprised, is within ±500 feet from a flight path and the speed of the aircraft measured in Mach number remains within ±0.2 over a period of 30 seconds for example.

Alternatively, the aircraft climb rate may be determined to be at a substantially steady rate over a predetermined period of time such as 30 seconds. However, any suitable indication, such as a parameter, that provide that the power plant is in a substantially stable state condition may be used. The time periods mentioned above are given by way of examples only and any suitable time periods may be used. The time periods used may vary in dependence on the operating state of the power plants.

The controller 54 may also be for identifying when the first and second power plants 42, 45 are at substantially the same power level, and for enabling the analyzer 36 and/or the alert generator 50 in response to identifying that the first and second power plants 42, 45 are at substantially the same power level.

The controller 54 may establish that both power plants are within ±1-2% of a parameter indicating the power level of the power plant. For example, one or more of the following may be used. The Engine Pressure Ratio (EPR), the speed of a fan at the front of a power plant (in the case of the power plant being a gas turbine engine) and/or the turbine power ratio (TPR). However, any suitable indication of the power level of a power plant may be used.

The receiver 62 is for receiving the first, second, third and fourth parameters 38, 44, 46, 48.

An example of the operation of the power plant analyzer 32 illustrated in FIG. 2B will be described below in relation to FIG. 5.

Figure 3:
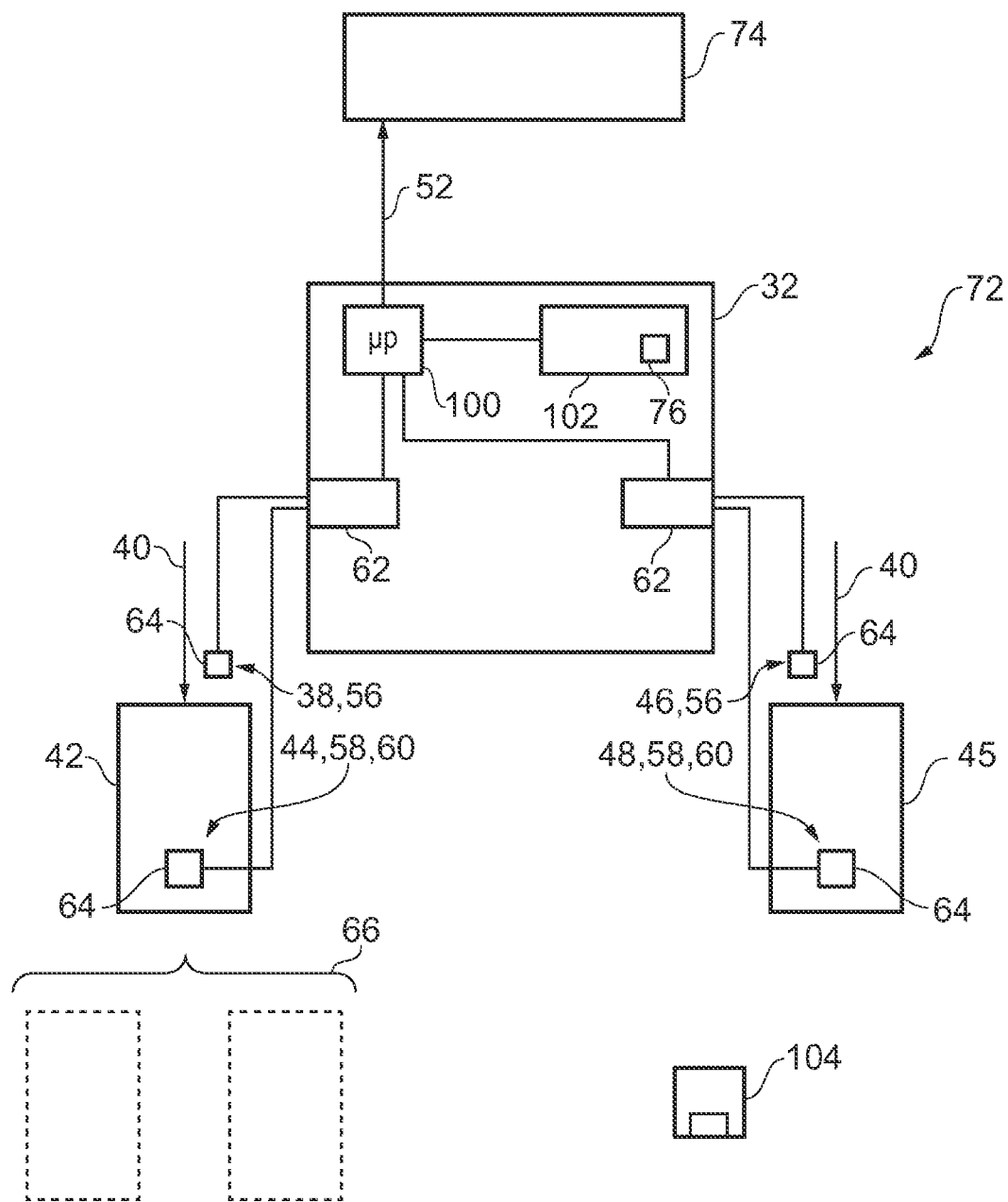
FIG. 3 illustrates a schematic example of an aircraft.

FIG. 3 illustrates a schematic example of an aircraft 72. The aircraft 72 comprises a cockpit 74, a power plant analyzer 32, a first power plant 42, a second power plant 45 and sensing means 64. For the sake of clarity only the elements of the aircraft 72 used in understanding embodiments are illustrated.

The power plant analyzer 32 may be such as those described with reference to FIGS. 2A and 2B above. However, in the embodiment illustrated in FIG. 3, the power plant analyzer 32 comprises a processor 100, a memory 102 storing a computer program 76 and receiver 62.

The memory 102 stores a computer program 76 comprising computer program instructions that control the operation of the power plant analyzer 32 when loaded into the processor 100. The computer program instructions 76 provide the logic and routines that enables the power plant analyzer 32 to perform the methods illustrated in FIGS. 4 & 5. The processor 100 by reading the memory 102 is able to load and execute the computer program 76.

The computer program may arrive at the power plant analyzer 32 via any suitable delivery mechanism 104. The delivery mechanism 104 may be, for example, a computer-readable storage medium, a computer program product, a memory device, a record medium such as a compact disc read-only memory (CD-ROM) or digital versatile disc (DVD), an article of manufacture that tangibly embodies the computer program 76. The delivery mechanism may be a signal configured to reliably transfer the computer program 76.

The power plant analyzer 32 may propagate or transmit the computer program 76 as a computer data signal.

The processor 100, in combination with the computer program 76, may be configured to carry out the functions of the analyzer 36 and/or the alert generator 50 and/or the controller 54 and/or the receiver 62 described above with regard to FIGS. 2A and 2B.

In the illustrated example only a single processor 100 and memory 102 are shown for clarity. However, the power plant analyzer 32 may comprise any number of processors 100 and memories 102 that may operate separately or in combination.

The receiver 62, which may for example be an interface, is configured to receive the first, second, third and fourth parameters 38, 44, 46, 48 from sensing means 64. The sensing means 64 for measuring the first and third parameters 38, 46 may, for example, be the fuel flow meters of the aircraft 72 and the sensing means 64 for measuring the second and fourth 44, 48 parameters may be any means suitable for measuring the exhaust gas temperature 60 and/or turbine gas temperature 58 of the first and second power plants 42, 45, for example a pyrometer and/or a thermocouple and/or a thermometer.

In the illustrated embodiment the first power plant 42 is an average of a plurality of power plants 66. That is, the first and second parameters 38, 44 for the first power plant 42 may be an average of parameters measured for a plurality of power plants 66.

Alternatively, the second power plant 45 may be an average of a plurality of power plants 66.

The power plant analyzer 32 is configured to carry out an analysis of the first, second, third and fourth parameters as described above with reference to FIGS. 2A and 2B and to generate an alert 52 in response to the analysis.

The alert may be generated in the cock pit 74, and may, for example, be an audible and/or visual alert generated in the cock pit 74.

In the example illustrated in FIG. 3 the power plant analyzer 32 comprises a processor 100 and a memory 102 storing a computer program 76. Additionally/alternatively, the power plant analyzer 32 may comprise a system that is capable of machine learning for example, a neural network.

Figure 4:
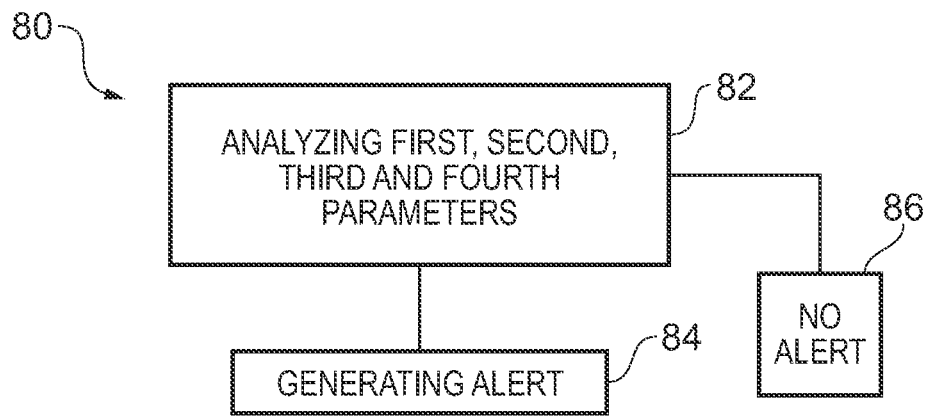
FIG. 4 illustrates a method for analyzing a plurality of power plants.

FIG. 4 illustrates a method 80 for analyzing a plurality of power plants. The method illustrated in FIG. 4 may be carried out, for example, by a power plant analyzer 32 as described above with reference to FIGS. 2A, 2B and 3.

At block 82 the first, second, third and fourth parameters 38, 44, 46, 48 are analyzed.

If the analysis indicates that there is an unexpected difference between the first and second power plants 42, 45, an alert is generated at block 84 in response to the analyzing block 82.

If the analysis indicates that there is no unexpected difference between the first and second power plants no alert is generated at block 86.

The method 80 may be repeated periodically during the operation of the power plants. The method 80 may be repeated over any suitable period of time, for example, every 30 seconds, or every minute, or every 5 minutes, or every 10 minutes and so on.

Figure 5:
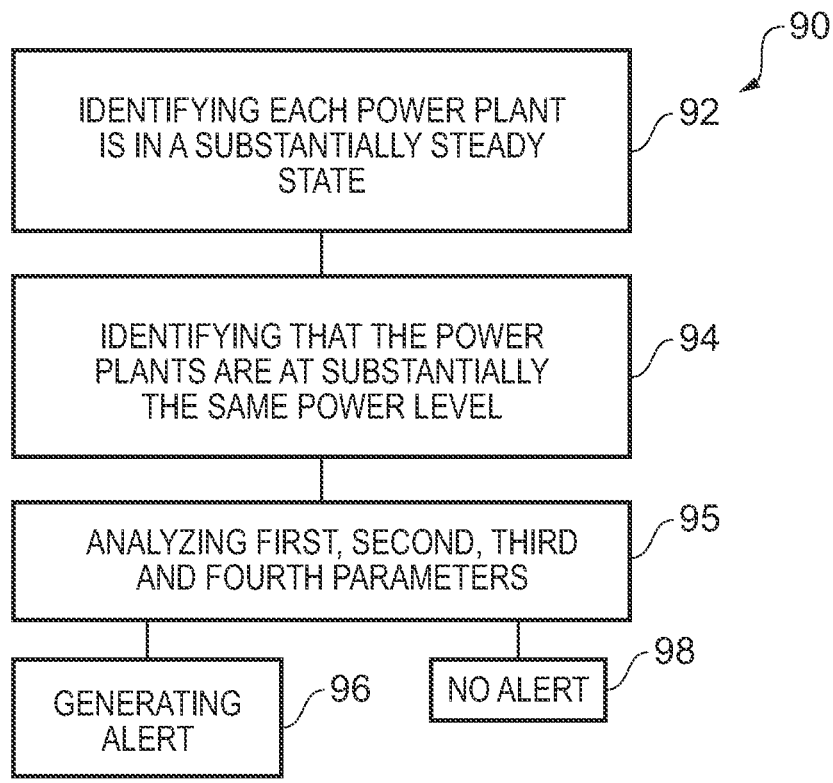
FIG. 5 illustrates further method for analyzing a plurality of power plants.

FIG. 5 illustrates a further method 90 for analyzing a plurality of power plants.

At block 92 it is identified that each power plant is in a substantially steady state. For example, power plants 1 and 2 as described above. This may be done as described above with reference to FIG. 2B.

At block 94 it is identified that the power plants are at substantially the same power level. This may be done as described above with reference to FIG. 2B.

At block 95 the first, second, third and fourth parameters 38, 44, 46, 48 are analyzed.

As discussed above, the first and third parameters 38, 46 may comprise the fuel flow rate to the first and second power plants 42, 45 respectively and the second and fourth parameters 44, 48 may comprise the turbine temperature, for example exhaust gas temperature 60 or turbine gas temperature 58, of the first and second power plants 42, 45 respectively.

The fuel flow rate to each power plant and turbine temperature of each power plant may be taken concurrently on all power plants to ensure that all power plants are at the same conditions and similar power setting when the parameters are recorded.

If the power plants 42, 45 are at the same power level and same state of deterioration, it would be expected that they would record the same fuel flow. However, it is likely that one would be older than the other. It is known that deterioration effects turbine temperature a well as fuel flow, as discussed above. There will be a general trend given by the following:

$$\frac{\Delta \text{ turbine temperature}}{K} = \Delta \text{ Fuel flow \%} \qquad \text{Equation 1}$$

Where:

K is a constant determined from simulations and/or modeling;

Δ turbine temperature is the difference between the turbine temperatures of the power plants and Δ Fuel flow % is the fuel flow difference between the power plants taken as a percentage of the fuel flowing to one power plant or an average of the fuel flowing to both power plants.

Thus the difference in the turbine temperature parameters between the power plants 42, 45 can be used to determine the expected difference in the fuel flow to the power plants 42, 45. A parameter:

$$P = \frac{\Delta \text{ turbine temperature}}{K} = \Delta \text{ Fuel flow \%} \qquad \text{Equation 2}$$

can be constructed as a measure of difference between the power plants, and whether one of the power plants is not following the expected deterioration trend. If the analysis determines that the parameter P is above or below some predetermined tolerance this implies that there may be an issue with one of the first and second power plants 42, 45.

The tolerance level may be varied depending upon factors such as the operating conditions of the power plants and the length of time that the power plants have been in steady state conditions.

For example, there may be, inter alia, a fuel flow meter fault, a temperature measurement fault, a power setting measurement fault, or a fuel leak in one of the first or second power plants 42, 45.

If it is determined that there is something uncertain about one of the power plants 42, 45 in block 95 an alert is generated at block 96.

If the power plants 42, 45 are functioning as expected, within given tolerances, an alert is not generated at block 98.

The method of FIG. 5 may be repeated periodically during the time which the power plants 42, 45 are functioning. The method 90 may be repeated over any suitable period of time, for example, every 30 seconds, or every minute, or every 5 minutes, or every 10 minutes and so on.

The methods may be performed in relation to any pair of parameter sets. A parameter set comprises the parameters indicative of the fuel flow to and fuel burned in a power plant. A parameter set may come from any power plant or from an average of power plants.

In some embodiments the above recited methods may be integrated over a period of time, such that the apparent fault would have to be indicated over some number of the valuations before an alert is generated. This reduces the potential for isolated data indications giving false alerts.

In the analysis described with reference to FIG. 5, the analysis may be carried out without the engines being at substantially the same power level. In this situation equation 1 is adjusted to compensate. For example, K in equation 1 above may be a function of one or more parameters such as parameters indicative of flight conditions and/or power level. Alternatively/additionally a second parameter, for example K2, may be included in equation 1 above to account for the power plants being at different power levels. K2 could be a function of power difference between the power plants, power level of the power plants and/or flight conditions.

Although in the description above specific examples of the first, second, third and fourth parameters have been given, any parameters that are indicative of the fuel flow to the power plants and the fuel burned in the power plants may be used.

Furthermore, although in the examples described above the same parameters have been used for each power plant, in embodiments different parameters may be used for some or all of the power plants analyzed.

Although in the examples described above two power plants have been described, in embodiments more than two power plants may be used in the analysis.

Although examples described above have been described with reference to aero gas turbine engines, the power plants may be gas turbine engines for use in other applications, such as marine gas turbine engines.

The analysis described in the examples given above may be refined using further parameters measured from the first and/or second power plants.

The blocks illustrated in the FIGS. 4 and 5 may represent steps in a method and/or sections of code in the computer program 76. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person of skill in the art are included within the scope of the invention as defined by the accompanying claims.

What is claimed is:

1. A power plant analyzer for analyzing a plurality of power plants, comprising:
analyzing means for analyzing a first parameter indicative of fuel flow to a first power plant, a second parameter indicative of fuel burned in the first power plant, a third parameter indicative of fuel flow to a second power plant and a fourth parameter indicative of fuel burned in the second power plant; and
alert generation means, responsive to the analyzing means, for generating an alert for the first or the second power plant, and
wherein the analyzing means is configured to carry out a differential analysis between the first and third parameters to produce a first result, and to carry out a differential analysis between the second and fourth parameters to produce a second result, and to compare the first and second results.

2. A power plant analyzer as claimed in claim 1, wherein the analyzing means is configured to carry out a differential analysis using the first, second, third and fourth parameters.

3. A power plant analyzer as claimed in claim 2, wherein the analyzing means carries out a differential analysis that takes the form of a difference between the first and third parameters and the second and fourth parameters.

4. A power plant analyzer as claimed in claim 2, wherein the analyzing means carries out a differential analysis that takes the form of a ratio between the first and third parameters and the second and fourth parameters.

5. A power plant analyzer as claimed in claim 1, wherein the analyzing means is configured to carry out a differential analysis between the first and second parameters to produce a first result, and to carry out a differential analysis between the third and fourth parameters to produce a second result and to compare the first and second results.

6. A power plant analyzer as claimed in claim 1, further comprising control means for identifying when the first and second power plants are in a substantially steady state and for enabling the analyzing means and/or the alert generation means, in response to identifying that the first and second power plants are in a substantially steady state.

7. A power plant analyzer as claimed in claim 1, further comprising control means for identifying when the first and second power plants are at substantially the same power level and for enabling the analyzing means and/or the alert generation means, in response to identifying that the first and second power plants are at substantially the same power level.

8. A power plant analyzer as claimed in claim 1, wherein the first parameter is indicative of a fuel flow rate to the first power plant and the third parameter is indicative of a fuel flow rate to the second power plant.

9. A power plant analyzer as claimed in claim 1, wherein the second parameter is indicative of a turbine gas temperature or an exhaust gas temperature of the first power plant and the fourth parameter is indicative of a turbine gas temperature or an exhaust gas temperature of the second power plant.

10. A power plant analyzer as claimed in claim 1, further comprising receiving means for receiving the first, second, third and fourth parameters from sensing means located to measure the first, second, third and fourth parameters in the first and second power plants.

11. A power plant analyzer as claimed in claim 1, wherein the first, second, third and fourth parameters are measured concurrently for the first and second power plants.

12. A power plant analyzer as claimed in claim 1, wherein the first or second power plant is an average of a plurality of power plants.

13. A power plant analyzer as claimed in claim 1, wherein the alert indicates a possible fuel leak in the first or second power plant.

14. A system comprising a power plant analyzer as claimed in claim 1 and the first and second power plants.

15. A system as claimed in claim 14, wherein the first and second power plants are aero gas turbine engines.

16. A system as claimed in claim 14, wherein the system is an aircraft further comprising a cockpit, wherein the alert generation means is configured to generate the alert in the cockpit of the aircraft.

17. A method for analyzing a plurality of power plants, comprising:
   analyzing a first parameter indicative of fuel flow to a first power plant, a second parameter indicative of fuel burned in the first power plant, a third parameter indicative of fuel flow to a second power plant and a fourth parameter indicative of fuel burned in the second power plant; and
   generating, in response to analyzing, an alert for the first or the second power plant, and
   wherein analyzing the first, second, third and fourth parameters comprises carrying out a differential analysis between the first and third parameters to produce a first result, and to carry out a differential analysis between the second and fourth parameters to produce a second result, and comparing the first and second results.

18. A method as claimed in claim 17, wherein analyzing the first, second, third and fourth parameters comprises carrying out a differential analysis using the first, second, third and fourth parameters.

19. A method as claimed in claim 17, wherein the second parameter is indicative of a turbine gas temperature or an exhaust gas temperature and the fourth parameter is indicative of a turbine gas temperature or an exhaust gas temperature.

20. A non-transitory computer-readable medium for storing a computer program for execution on a computer, causing the computer to perform:
   analyzing a first parameter indicative of fuel flow to a first power plant, a second parameter indicative of fuel burned in the first power plant, a third parameter indicative of fuel flow to a second power plant and a fourth parameter indicative of fuel burned in the second power plant; and
   generating, in response to analyzing, an alert for the first or the second power plant, and
   wherein analyzing the first, second, third and fourth parameters comprises carrying out a differential analysis between the first and third parameters to produce a first result, and to carry out a differential analysis between the second and fourth parameters to produce a second result, and comparing the first and second results.

21. A non-transitory computer-readable medium claimed in claim 20, wherein analyzing the first, second, third and fourth parameters comprises carrying out a differential analysis using the first, second, third and fourth parameters.

22. An apparatus comprising:
   at least one processor; and
   at least one memory including computer program code;
   the at least one memory and the computer program code configured to, with the at least one processor, cause the apparatus at least to
   analyze a first parameter indicative of fuel flow to a first power plant, a second parameter indicative of fuel burned in the first power plant, a third parameter indicative of fuel flow to a second power plant and a fourth parameter indicative of fuel burned in the second power plant; and
   generate, in response to analyzing, an alert for the first or the second power plant, and
   wherein analyzing the first, second, third and fourth parameters comprises carrying out a differential analysis between the first and third parameters to produce a first result, and to carry out a differential analysis between the second and fourth parameters to produce a second result, and comparing the first and second results.

* * * * *